(12) United States Patent
Ida et al.

(10) Patent No.: US 6,799,859 B1
(45) Date of Patent: Oct. 5, 2004

(54) SURFACE ILLUMINANT DEVICE AND PRISM SHEET USED THEREFOR

(75) Inventors: Kozo Ida, Kawasaki (JP); Muneo Yoneda, Nagoya (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 113 days.

(21) Appl. No.: 10/333,693

(22) PCT Filed: Jul. 24, 2000

(86) PCT No.: PCT/JP00/04928

§ 371 (c)(1),
(2), (4) Date: Jan. 23, 2003

(87) PCT Pub. No.: WO02/08662

PCT Pub. Date: Jan. 31, 2002

(51) Int. Cl.[7] .............................. F21V 7/04; F21V 5/02
(52) U.S. Cl. ......................... 362/26; 362/31; 362/335; 362/337
(58) Field of Search .............................. 362/31, 26, 27, 362/337, 339, 340, 331, 335; 349/65

(56) References Cited

U.S. PATENT DOCUMENTS

| | | | |
|---|---|---|---|
| 5,555,160 A | * | 9/1996 | Tawara et al. ................ 362/31 |
| 6,206,535 B1 | * | 3/2001 | Hattori et al. ................ 362/31 |
| 6,247,826 B1 | * | 6/2001 | Funamoto et al. ............ 362/31 |
| 6,332,691 B2 | * | 12/2001 | Oda et al. ..................... 362/31 |
| 6,570,710 B1 | * | 5/2003 | Nilsen et al. ................. 359/625 |

FOREIGN PATENT DOCUMENTS

| | | |
|---|---|---|
| JP | 3-69184 U | 7/1991 |
| JP | 7-27136 B | 3/1995 |
| JP | 7-27137 B | 3/1995 |
| JP | 7-318729 | 12/1995 |
| JP | 10-254371 | 9/1998 |
| JP | 11-120810 | 4/1999 |
| JP | 11-329030 | 11/1999 |

* cited by examiner

*Primary Examiner*—Sandra O'Shea
*Assistant Examiner*—Peggy A. Neils
(74) *Attorney, Agent, or Firm*—Morgan, Lewis & Bockius, LLP

(57) ABSTRACT

A surface illuminant device for illuminating a short-distance observation picture plane, capable of easily being enlarged in area without inviting a non-uniformity in visibility, the device comprising a light guide (12), a light reflection member (18), a linear light source disposed to extend in a Y-direction along a light incident end face in a Y-Z plane of the light guide (12), and a prism sheet (20) for converting a light advancing direction. The light guide (12) has a light outgoing mechanism of a fine unevenness structure for emitting from a light outgoing surface (12-3) an incident light from the linear source, and a light focusing means for acting on the light passed through the light guide (12) and the prism sheet (20) to allow it to leave in a focused status. The light focusing means is formed so that a prism apex angle $\alpha$, an inclination $\beta$ with respect to a normal to the prism sheet, a change rate $\gamma$ of $\beta$ with respect to a prism arraying direction, and a prism arraying pitch P satisfy 55 deg.$\leq \alpha \leq$75 deg., $-20$ deg.$\leq \beta \leq +20$ deg., 0.2 deg./cm$\leq \gamma \leq$1.5 deg./cm, 10 $\mu$m $\leq$P$\leq$1000 $\mu$m.

21 Claims, 6 Drawing Sheets

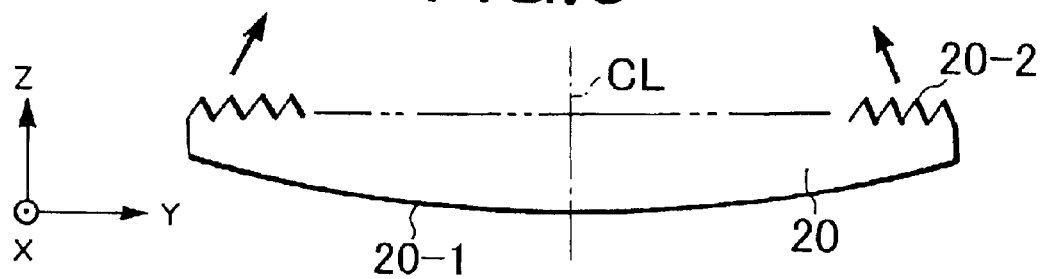
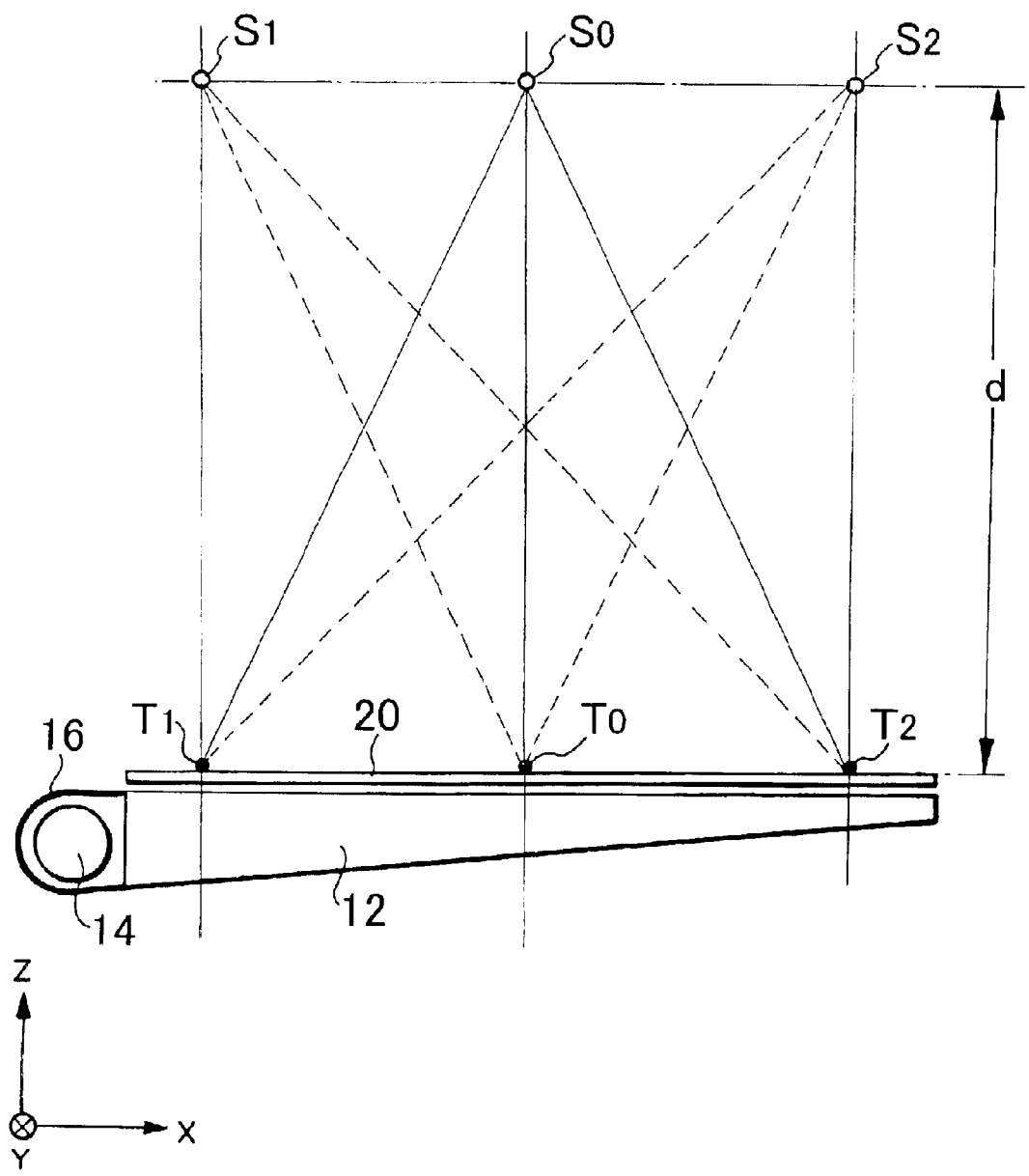

SURFACE ILLUMINANT DEVICE AND PRISM SHEET USED THEREFOR

TECHNICAL FIELD

The present invention belongs to a technical field of illumination, and particularly to a surface illuminant device and a prism sheet used therefore

BACKGROUND ART

In a liquid crystal display device (liquid crystal display) used to constitute a display screen of a note type personal computer, back illumination is used to make the display bright and easily viewable. A so-called edge light type surface illuminant device in which a linear light source is disposed along the end face of a plate-shaped light guide to emit illumination light from one principal surface (obverse surface) of the light guide is used in order to irradiate illumination light to the overall area of the display screen as uniformly as possible and also make the overall construction of the display device containing the illuminant light source as thin as possible. Such an edge light type surface illuminant device as described above is described in JP(U)-3-69184, JP(B)-7-27136, JP(B)-7-27137, etc.

In the surface illuminant device or planar light source device as described above, light which is emitted from the linear light source and incident into the light guide is transmitted to the end face confronting the incident end face in the light guide while repetitively reflected from the obverse surface thereof and the back surface thereof which is formed substantially in parallel to the obverse surface or obliquely to the obverse surface. A part of the light is emitted from the light emission face of the light guide by a light emitting structure formed in the light guide in course of the light transmission. The emission light has a directivity in a direction different from a viewing direction. Therefore, a prism sheet or the like is used in order to emit light while changing the directivity of the light to a required direction With respect to the prism sheet, as disclosed in JP(U)-3-69184, the prism face thereof is frequently disposed so as to confront the opposite side to the light guide, and prism sheets are usable to be superposed on each other so that the directions of the prism ridge lines are perpendicular to each other. Furthermore, there has been proposed a surface illuminant device in which the prim face of the prism sheet is disposed in such a manner as to face the light guide side as disclosed in JP(B)-7-27136 and JP(B)-7-27137.

Meanwhile, the display screen of the note type personal computer has been recently required to be increased in size, and in order to satisfy this requirement, the surface illuminant device has been also required to be increased in area. Even when the area is increased as described above, it is required to generate illumination light which is as uniform and high in intensity as possible over the whole surface. Particularly, with respect to a note type personal computer or liquid crystal monitor, it is viewed from a short distance of about 30 to 40 cm, and thus the angle at which light directing to the eyes of a viewer intersects to the normal line of the screen is greatly different between the center portion and the peripheral portion of the screen, which causes non-uniformity of visibility.

JP(A)-7-318729 discloses a surface illuminant device in which such a linear Fresnel lens sheet that the intersecting angle of the long side of each elongated prism to the sheet surface is increased as it is far away from the position beneath the point of view on the cross section perpendicular to the elongated prisms is disposed on the light emission face of the light guide so that the lens face serves as the light emission surface, thereby converging the emission light to the point-of-view position or eyes position.

In such a surface illuminant device, the emission light can be converged to the point-of-view position However, the lens sheet is disposed so that the lens face serves as the light emission surface and the emission light is focused by the refraction action of the long side of the prism, so that the light using efficiency is low and thus no surface illuminant device having sufficiently high brightness can be achieved. Furthermore, since the emission light is focused by the refraction action of the prism long side, it is required to use a diffusion sheet or the like so as to deflect the emission light from the light guide in a direction of about 0 to 30 degrees with respect to the normal line of the sheet surface. As described above, the emission light from the light guide having high directivity cannot be directly focused in the point-of-view position, resulting in reduction of the brightness. Still furthermore, since the emission light is focused by the refraction action of only the prism long side, light which is reflected and returned from one end face of the light guide when a linear light source is disposed at the other end face of the light guide cannot be focused in a prescribed position, and also light which comes from a light source disposed at the side of the prism long side when linear light sources are equipped at both the end faces of the light guide cannot be focused in a prescribed position, and thus the light using efficiency is reduced.

DISCLOSURE OF THE INVENTION

Therefore, an object of the present invention is to provide an edge light type surface illuminant device for illumination of a screen which is viewed from a relatively short distance, which can be easily increased in area without occurrence of non-uniformity of visibility.

That is, according to the present invention, there is provided a surface illuminant device or planar light source device having a plate-shaped light guide in which one principal surface serves as a light emission face and at least one end face serves as a light incident face, a light source disposed so as to extend along the light incident face of the light guide and a light travel direction converting prism sheet disposed on the light emission face of the light guide, characterized in that an incident surface of the prism sheet is disposed so as to face the light emission face of the light guide, plural elongated prisms are arranged in parallel to one another on the incident surface of the prism sheet so as to extend substantially in parallel to the light incident face of the light guide, the light guide has a light emitting structure with which light introduced into the light guide from the light source through the light incident face is emitted from the light emission face, and there is provided light focusing means for acting on light passed through the light guide and the light travel direction converting prism sheet so that the light is emitted from the prism sheet under a focused state.

Furthermore, according to the present invention, there is provided a prism sheet for use in a surface illuminant device as described above, characterized in that plural elongated prisms are arranged in parallel to one another on one surface thereof, and the apex angles $\alpha$ of the elongated prisms and the variation rate $\gamma$ of the inclination angles $\beta$ of the elongated prisms to the normal direction of the prism sheet in a direction perpendicular to the extending direction of each elongated prism satisfy the following conditions:

$$55 \text{ degrees} \leq \alpha \leq 75 \text{ degrees}$$

0.2 degree/cm ≤ γ ≤ 1.5 degree/cm.

Still furthermore, according to the present invention, there is provided a surface illuminant device or planar light source device having a plate-shaped light guide in which one principal surface serves as a light emission face and at least one end face serves as a light incident face, a light source disposed so as to extend along the light incident face of the light guide and a light travel direction converting prism sheet disposed on the light emission face of the light guide, characterized in that an incident surface of the prism sheet is disposed so as to face the light emission face of the light guide, plural elongated prisms are arranged in parallel to one another on an emission surface at the opposite side to the incident surface of the prism sheet so as to extend substantially in parallel to the light incident face of the light guide, the incident surface or emission surface of the prism sheet is curved in a convex or concave shape in the direction perpendicular to the light incident face of the light guide, and said light guide has a light emitting structure for emitting from the light emission face light which is introduced into the light guide from the light source through the light incident face.

BRIEF DESCRIPTION OF THE DRAWINGS

FIG. 9 is a schematic diagram showing an example of light focusing means of the surface illuminant device according to the present invention;

FIG. 10 is a schematic diagram showing a measurement of in-plane brightness ratio.

BEST MODE FOR CARRYING OUT THE INVENTION

Figure 1:
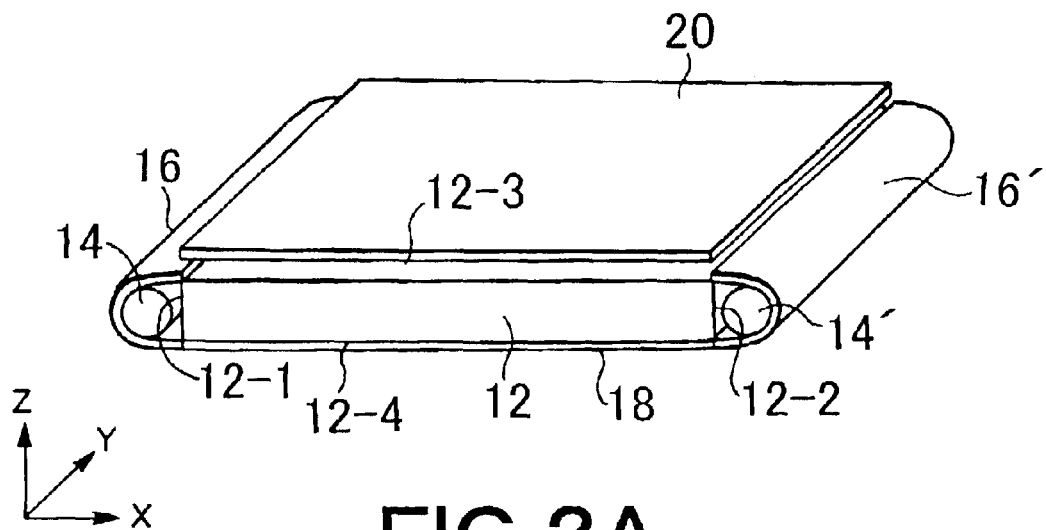
FIG. 1 is a schematic perspective diagram showing the construction of an embodiment of a surface illuminant device according to the present invention.

FIG. 1 is a schematic perspective view showing the construction of an embodiment of a surface illuminant device or planar light source device according to the present invention.

In FIG. 1, reference numeral 12 represents a plate-shaped light guide having a rectangular shape, and reference numeral 14, 14' represents a light source disposed so as to extend along the end face of the plate-shaped light guide 12. The light source 14, 14' is not limited to a specific one, however, it may be a linear light source. The following description will be made on the assumption that the light source is a linear light source. Reference numeral 16, 16' represents a reflector attached to the linear light source 14, 14', respectively. Reference numeral 18 represents a light reflecting member. Reference numeral 20 represents a light travel direction converting prism sheet.

In the light guide 12, one end face 12-1 extending in Y-direction is set as a first light incident face, and an end face 12-2 confronting the first light incident face 12-1 is set as a second light incident face. An obverse surface (upper face) 12-3 serving as a first principal surface in X-Y plane which is substantially perpendicular to the two end faces 12-1, 12-2 is set as a light emission face. The light guide 12 has a back source (lower face) 12-4 serving as a second principal surface in the X-Y plane at the opposite side to the obverse surface 12-3. The light reflecting member 18 is affixed to the back surface 12-4. Furthermore, a light reflecting member may be affixed to the end faces other than the two light incident faces as in the case of the back surface.

In this embodiment, the two confronting end faces of the light guide 12 are set as the light incident faces as shown in FIG. 1. However, in the present invention, it is possible to set any one of the two end faces as a light incident face. In this case, it is preferable that a light reflecting member is affixed to the end face confronting the light incident face.

The linear light source 14 is disposed so as to be adjacent to the end face 12-1 of the light guide while extending in Y-direction along the end face 12-1. A part of light emitted from the linear light source 14 is directly introduced into the light guide 12 through the light incident end face 12-1 while another part of the light is reflected by the reflector 16 and then introduced into the light guide 12 through the light incident end face 12-1. The linear light source 14' is disposed so as to be adjacent to the end face 12-2 of the light guide while extending in the Y-direction along the end face 12-2. A part of light emitted from the linear light source 14' is directly introduced into the light guide 12 through the light incident end face 12-2 while another part of the light is reflected by the reflector 16' and then introduced into the light guide 12 through the light incident end face 12-2. The diction of the light incidence into the light guide 12 is opposite between the linear light source 14 and the linear light source 14'.

The light introduced into the light guide 12 suffers repetitive reflection such as total reflection or the like from the back surface 12-4 affixed with the light reflecting member 18 and the light emission face 12-3, and it is transmitted to the end face confronting the end face onto which it is incident. In course of the light transmission, a part of light emitted from the back surface 12-4 is reflected by the light reflecting member 18, and made to be introduced again into the light guide 12 through the back surface 12-4. In course of the light transmission, a part of the light is emitted from the light emission face 12-3. The light emission from the light emission face 12-3 is performed mainly on the basis of the action of the following light emitting structure or light outgoing mechanism which is formed in the light guide 12.

In the present invention, it is preferable from the viewpoint of achieving high brightness that the emission light emitted from the light emission face of the light guide is light having high directivity. That is, the emission light has such high directivity that the direction of the maximum peak of luminous intensity distribution of emission light intersects the normal line of the light emission face of the light guide by 50° to 85°, preferably by 60° to 80°, and the half maximum full-width of the distribution is equal to 10° to 35°, preferably to 15° to 30°. This is because the brightness can be sufficiently increased by setting the direction of the maximum peak to 50° or more and setting the half maximum full-width to 35° or less, and also the direction of the emission light can be easily changed to a desired direction by the prism sheet by setting the maximum peak to 85° or less and setting the half maximum full-width to 10° or more.

A directive light emitting structure for the light guide which emits emission light having such high directivity may be achieved by forming minute irregularities or unevenness structure on at least one surface of the light emission face and the back surface of the light guide, by coating or printing white, light-diffusive coating or the like or by dispersing light diffusion materials in the light guide. Among these, the formation of the minute irregularities or the dispersion of the light diffusion materials is preferable from the viewpoint of achieving the high directivity. The minute irregularities may be achieved by uniformly roughening or forming lens units. From the viewpoint of the balance between the enhancement of brightness and the uniformity ratio of brightness within the light emission face of the light guide, the average inclination angle is particularly preferably equal to about 2° to 10°. The average inclination angle (θa) may be determined according to ISO4287/1-1984 by measuring the roughened surface shape with a probe type surface-roughness tester to thereby obtain an inclination function f(x) while setting the coordinate in a measurement direction as x and calculating the following equations (1) and (2) by using the obtained inclination function f(x). Here, L represents the measurement length. By setting the average inclination angle (θa) to 2° or more, the emission rate of the emission light from the light guide can be increased (that is, it is prevented from being excessively reduced) and thus increase the brightness, and by setting it to 8° or less, the emission rate of the emission light from the light guide (that is, it is prevented from being excessively increased), so that the uniformity ratio of brightness within the light emission face can be enhanced.

$$\Delta a = (1/L) \int_0^L |(d/dx) f(x)| dx \quad (1)$$

$$\theta a = \tan^{-1}(\Delta a) \quad (2)$$

Such minute irregularities may be substantially isotropic or have directivities. A processing method for forming substantially isotropic minute irregularities is not limited to a specific one, and there may be used a method of transferring a roughened surface of a metal mold under hot press by using the metal mold having a roughened surface formed by chemical etching using hydrofluoric acid or the like or the metal mold whose surface is roughened by spraying fine particles such as glass beads or the like, a method of coating or fixing transparent materials for making irregularities by a printing method or the like, and a method of directly processing the light guide to have a roughened surface by a blast method, an etching method or the like.

The minute irregularities having the directivities may be achieved by forming many minute grooves or projections such as elongated prisms, lenticular lenses or the like which extend substantially in parallel to the light incident face of the light guide, and the pitch thereof is preferably equal to about 1 μm to 2 mm. The many minute grooves or projections are preferably formed by arranging plural elongated prisms in parallel to one another which are triangular in section By forming such elongated prisms, a proper emission light distribution can be given in accordance with a viewing angle range, and also the uniformity ratio of brightness of emission light within the light emission face can be enhanced.

Organic fine particles such as resin beads or inorganic fine particles such as glass beads may be used as the light diffusion materials to be dispersed in the light guide, and there may be used fine light-transmissible particles which have a refractive index different from that of the material constituting the light guide and have a particle diameter of about 2 to 100 μm, preferably about 4 to 50 μm. Such light diffusion materials may be uniformly dispersed in the whole of the light guide, dispersed with a fixed concentration distribution or dispersed unevenly to be layered in the neighborhood of the light emission face or the back surface. Such light diffusion materials may be used in combination with the minute irregularity structure described above.

The light guide may be designed to have a fixed thickness as shown in FIG. 1, to have a so-called wedge shape in which the thickness is gradually reduced from the position of the light incident face to the position of the end face confronting the light incident face, or to have such a shape that the thickness is gradually reduced from both the end portions to the center thereof.

Figure 2A:
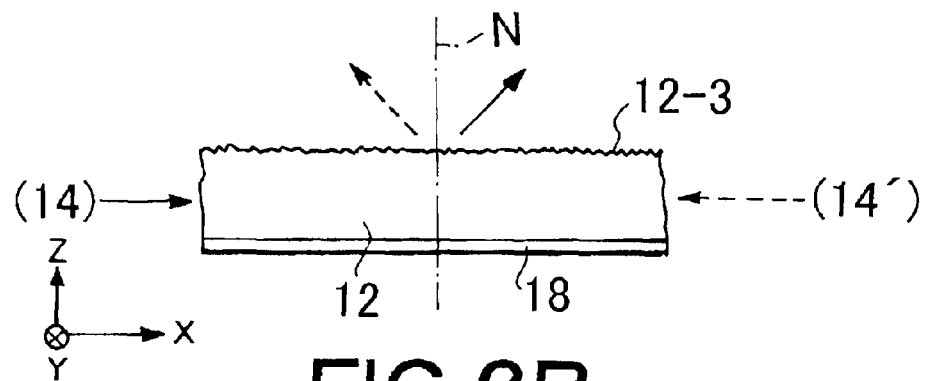
FIGS. 2A to 2C are schematic diagrams showing a specific example of a light emitting structure of the surface illuminant device according to the present invention.
Figure 2B:
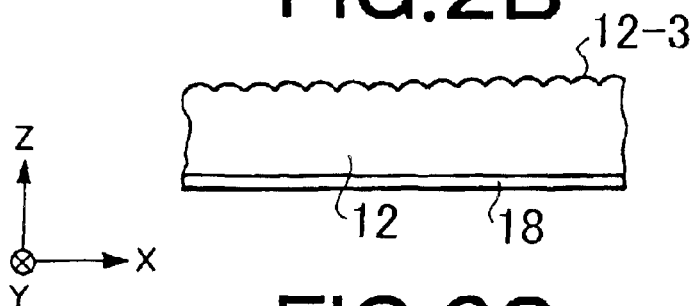
Figure 2C:
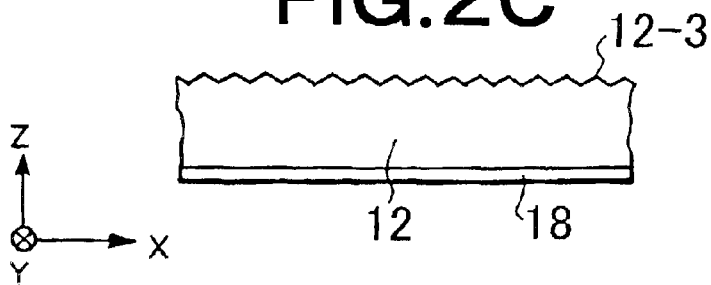

FIGS. 2A to 2C show a specific example of the light emitting structure as described above. In FIG. 2A, the light emitting structure corresponds to the substantially isotropic minute irregularities formed on the light emission face 12-3 of the light guide 12. FIGS. 2B and 2C show examples in which plural minute elongated lenses extending in parallel to one another are formed as the light emitting structure on the light emission face 12-3 of the light guide 12. In FIG. 2B, lenticular lenses are formed as the minute elongated lenses, and in FIG. 2C, elongated prisms are formed as the minute elongated lenses.

In the foregoing description, the light emitting structure comprising the minute structure is formed on the light emission face 12-3, however, the same minute structure may be formed on the back surface 12-4 or on both the light emission face 12-3 and the back surface 12-4 to constitute the light emitting structure.

As shown in FIG. 2A, light beams introduced into the light guide 12 from the linear light sources 14, 14' are emitted to oblique upper directions at some level so as to have conformable directivities by the light emitting structure (for example, by 50 degrees to 85 degrees with respect to the normal line N of the principal surface of the light guide: the emission directions of light based on the light emitted from the linear light source 14 [indicated by a solid line] and light based on the light emitted from the linear light source 14' [indicated by a broken line] are substantially symmetrical with respect to the normal line N of the light guide). However, actually, the light emitted from the light emission face 12-3 has a distribution in the travel direction within X-Z plane.

Furthermore, in combination with the light emitting structure as described above, elongated prisms extending substantially in the perpendicular direction to the light incident face may be formed on the light emission face or back surface of the light guide to narrow the emission light distribution in the direction perpendicular to the extension direction of the elongated prisms. The apex angle of each of the elongated prisms is preferably set to 120 to 150°. This is because the brightness as a surface illuminant device can be enhanced by setting the apex angle of each elongated prism to 120° or more and an emission light distribution having proper spreading can be given in accordance with the viewing angle range by setting the apex angle of each elongated prism to 150° or less. The apex angle of each elongated prism is preferably set within the range from 120° to 145°, and further preferably within the range from 125° to 140°.

A plastic sheet having a metal deposition reflecting layer formed on the surface thereof may be used as the light reflecting member 18 affixed to the back surface 12-4 of the light guide 12. The light reflecting member 18 may have a regular reflection function or diffuse reflection function Or, a light reflecting member 18 having a pattern reflection function in which the reflection rate is partially varied or the reflection area rate is partially varied may be used to make the light emission from the light emission face 12-3 of the light guide uniform over the whole surface. The light reflecting member 18 may be achieved by omitting the reflection sheet as described above and forming a reflection layer on the back surface 12-4 of the light guide by metal deposition or the like.

The light beams emitted from the light emission face 12-3 of the light guide 12 with having directivities travel or advance substantially in the oblique upper directions, and introduced into the light travel direction converting prism sheet 20 disposed adjacently to the light emission face 12-3. The prism sheet 20 has an action of varying to a desired direction the travel direction or advancing direction of light which is incident substantially obliquely with respect to the sheet normal line direction (the direction of the normal line N of the light guide 12) (that is, converting the travel direction). The sheet normal line direction may be used as the desired direction, for example.

Figure 3:
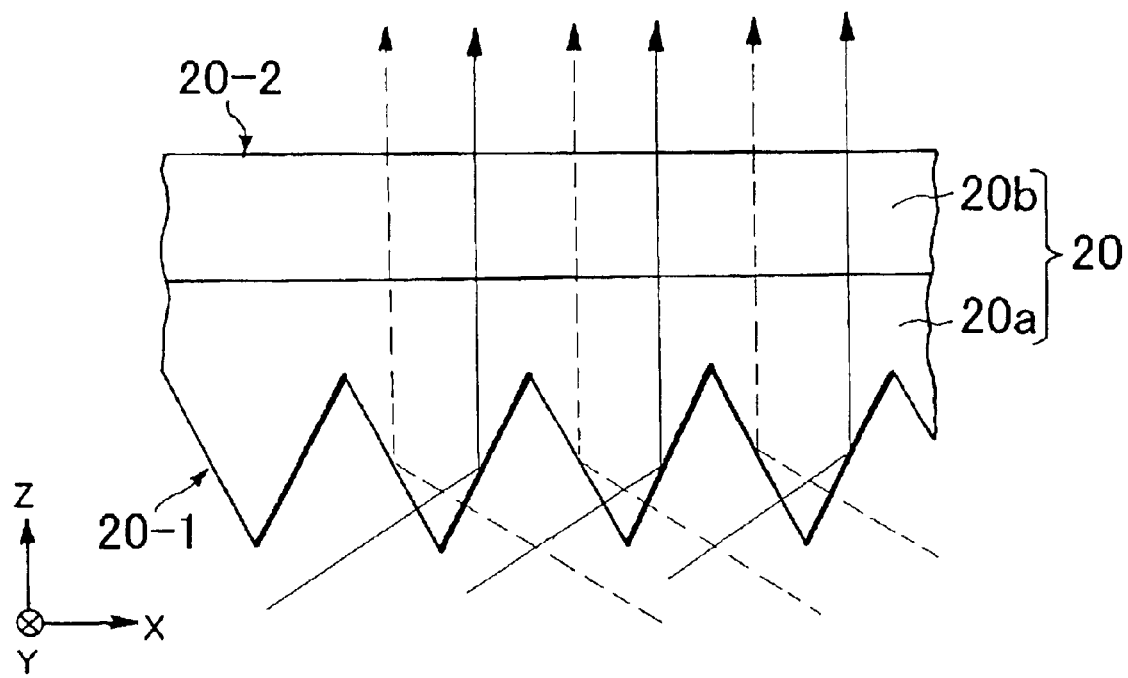
FIG. 3 is a schematic diagram showing an example of a prism sheet of the surface illuminant device according to the present invention.

FIG. 3 shows an example of the prism sheet 20. The prism sheet 20 comprises a lower-side prism portion 20a having a lower surface serving as a prism surface and an upper surface having a flat plane, and an upper-side sheet type base portion 20b. The prism portion 20a may be constructed by an active energy-beam curable type resin material and the base portion 20b may be formed of polyester resin, acrylic resin, polycarbonate resin, vinyl chloride resin, polymethacrylic imide resin or the like. A polarizing sheet or polarization converting sheet, or a light diffusion sheet may be used as the base portion 20b as occasion demands. The prism sheet 20 may be integrally formed of the same material without discriminating the prism portion 20a and the base portion 20b from each other.

A light-transmissible resin material having a birefringence index of 0.02 or less may be used as the material of the prism sheet 20, particularly as the material of the prism portion 20a, as occasion demands. Furthermore, as the prism sheet 20, particularly the prism portion 20a, may be used a light-transmissible resin material containing light-transmissible particles which are equal to 1 to 50 $\mu$m in average particle diameter and different from the refractive index of the light-transmissible resin by 0.002 or more. This material brings a light diffusion property.

As shown in FIG. 3, the incident surface 20-1 of the prism sheet 20 is set as a prism surface on which plural Y-direction columnar prisms are arranged in parallel to one another. Light which is emitted from the light guide 12 and introduced into the prism sheet 20 suffers internal reflection by the prism face, travels in the direction of the sheet normal line N and emits from the emission surface 20-2. As shown in FIG. 3, light emitted from the linear light source 14 [indicated by a solid line] and light emitted from the linear light source 14' [indicated by a broken line] suffer internal reflection by the surfaces at the opposite sides of each prism.

Figure 4:
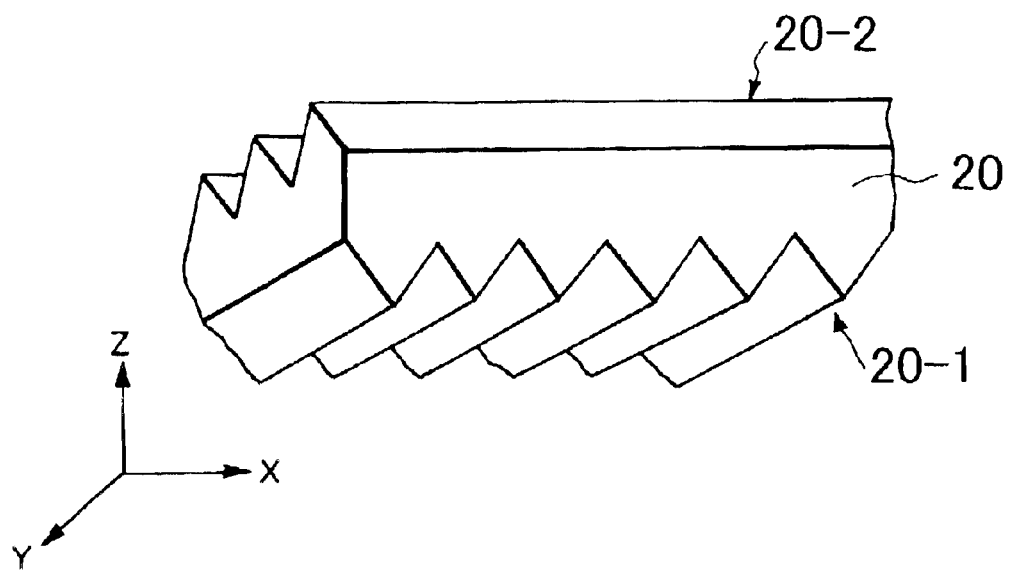
FIG. 4 is a schematic diagram showing another example of the prism sheet of the surface illuminant device according to the present invention.

FIG. 4 shows another example of the prism sheet 20. Both the lower surface (incident surface) and the upper surface (emission surface) of the prism sheet 20 are set as prism faces. The lower surface (incident surface) is designed as the prism surface like the prism surface shown in FIG. 3, and the upper surface (emission surface) is designed by arranging elongated prisms each having an apex angle of about 80 degrees to 140 degrees in parallel to one another. Each prism of the incident surface 20-1 extends in the Y direction, and each prism of the emission surface 20-2 extends substantially along the X-direction perpendicular to the Y-direction. Each prism of the incident surface 20-1 deflects light mainly by the internal reflection action thereof within the X-Z plane, and each prism of the emission surface 20-2 deflects light mainly by the refracting action thereof within the Y-Z plane.

FIGS. 5 to 8 are schematic diagrams showing a specific example of light focusing means according to the present invention.

Figure 5:
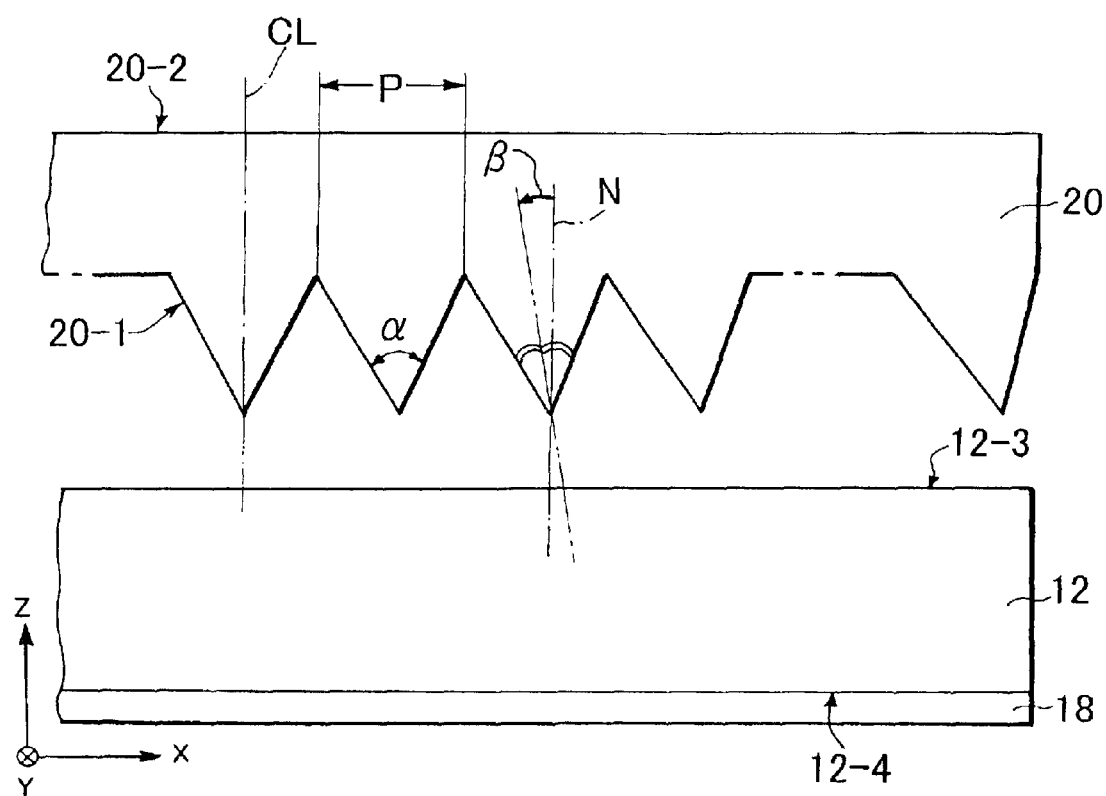
FIG. 5 is a schematic diagram showing the structure of the prism sheet of the surface illuminant device according to the present invention.

The light focusing means shown in FIG. 5 is formed by designing the plural elongated prisms of the prism sheet 20 in a special shape. FIG. 5 shows the shape of the plural elongated prisms of the prism sheet according to the present invention. The prism sheet 20 comprises plural columnar prisms extending in the Y direction which are disposed in parallel to one another on a surface of the prism sheet (the incident surface 20-1) disposed so as to face the light emission face 12-3 of the light guide 12. The apex angle a of each prism and the variation rate y of the inclination angle P to the sheet normal line N with respect to the prism arrangement direction or prism arraying direction (X direction) perpendicular to the extending direction (Y direction) of each prism are set so as to satisfy the following conditions:

$$55 \text{ degrees} \leq \alpha \leq 75 \text{ degrees}$$

$$0.2 \text{ degree/cm} \leq \gamma \leq 1.5 \text{ degree/cm}$$

Here, the inclination A to the sheet normal line N of each prism is defined as an angle at which the symmetry plane of the two faces of each prism intersects to the sheet normal line N, and signs are set so that the direction shown in FIG. 5 is set as a positive sign and the opposite direction is set as a negative sign. The variation rate $\gamma$ of $\beta$ with respect to the prism arrangement direction represents variation of $\beta$ every unit-distance (1 cm) shift in the positive direction (to the right direction in FIG. 8) with respect to X.

In the prism sheet 20, $\beta$ is set to zero degree at the center with respect to the prism arrangement direction (the center line CL of the prism sheet 20 within the X-Z plane). Accordingly, the shape of the prism surface (incident surface 20-1) is designed to be symmetrical with respect to the center line CL.

By designing the prism surface in such a shape as described above, light which is internally reflected by each prism (see FIG. 3) is focused within the X-Z plane as a whole (in accordance with the distance from CL, the deflection angle is increased as the distance is increased), and the light is focused to the neighboring of the position of a viewer who is spaced away at a distance of about 30 to 40 cm on CL after passing through the sheet.

The prism arrangement pitch or prism arraying pitch is not limited to a specific one, however, it is preferably set to 10 to 1000 $\mu$m, and more preferably to 15 to 100 $\mu$m.

Furthermore, $\alpha$, $\beta$ and $\gamma$ of the prism sheet 20 will be described hereunder.

Apex Angle $\alpha$

When the elongated prism arrangement surface of the prism sheet is disposed so as to face the light emission face of the light guide, light which is incident on the light emission surface of the prism sheet in an oblique direction to the normal line direction of the light emission face of the light guide is internally reflected from the face of each elongated prism by the total reflection action and deflected in angle to the normal line direction of the light emission face. As described above, the travel direction of the incident light is changed by the total reflection action of the elongated prisms, so that the light using efficiency can be enhanced and there can be achieved an emission light intensity distribution of a surface illuminant device which substantially corresponds to the intensity distribution of the emission light from the light guide. Accordingly, the direction of light having a distribution which is made proper by the light guide can be changed to a target direction efficiently. In this case, the prism apex angles of the elongated prisms of the prism sheet are set to 55 to 75°, and the apex angle of each elongated prism is fixed. Within this angle range, the direction of the light can be efficiently changed to the target direction with the total reflection. The prism apex angle is preferably set in the range from 60° to 70°.

Variation Rate γ

The elongated prisms of the prism sheet are arranged so that the elongated prism having the inclination angle β nearest to 0 degree is located at the center position and the inclination angles β of the other elongated prisms are gradually increased as they are farther away from the elongated prism located at the center position. The variation in inclination angle β of the elongated prisms may be continuous (that is, the inclination angle β is varied every elongated prism in the sequentially-arranged elongated prisms) or stepwise (that is, a prism group is formed every some elongated prisms in the sequentially-arranged elongated prisms, and the inclination angle β is fixed in the same prism group while it is varied every prism group). However, the variation rate γ per 1 cm is set to 0.2° to 1.5°. If the variation rate is less than 0.2°/cm, the focusing position of the emission light would be far away from the surface of the surface illuminant device, and thus there would be a tendency that the effect of the present invention cannot be sufficiently achieved. In addition, it is very difficult to manufacture a prism pattern having a small variation rate. On the other hand, if the variation rate is greater than 1.5°/cm, the focusing position of the emission light would be near to the surface of the surface illuminant device, and thus there would be a tendency that the effect of the present invention cannot be sufficiently achieved. Particularly when the variation rate is stepwise varied, there is a tendency that the uniformity is lowered because the variation points of the inclination angle β are visible. The variation rate γ is preferably set to 0.4° to 1.2°/cm, and more preferably to 0.5° to 1°/cm.

In the present invention, by setting the inclination angle β of the elongated prism at the center position to 0 degree, the direction of the emission light at this position can be set to the normal line direction. This is preferable because a surface illuminant device having high normal line brightness can be achieved. In the present invention, the position just above the location position of the center elongated prism substantially corresponds to the viewing position (point-of-view position). Therefore, it is preferable that the center elongated prism whose inclination angle is equal to 0 degree or nearest to 0 degree is disposed at the center position of the prism sheet relative to the elongated prism arrangement direction.

Furthermore, according to the present invention, by setting the apex angle of each elongated prism of the prism sheet to a fixed value and varying the inclination angle β thereof, even when linear light sources are disposed at both the ends of the light guide, light beams from both the linear light sources can be focused to the same position. Therefore, the present invention is suitably applied to a liquid crystal monitor or a large-size surface illuminant device used for advertisement, an advertising display or the like. Even when a linear light source is disposed only at one end of the light guide, light which is reflected and returned from the other confronting end can be focused to the same position, so that the light using efficiency can be enhanced This is because according to the prism sheet of the present invention, light incident from one side relative to the arrangement direction of the elongated prisms is totally reflected by the prism face at the opposite side to the light incident side of each elongated prism, so that light beams incident from both the right and left sides can be totally reflected by the corresponding prism faces of each elongated prism and emitted therefrom.

Inclination Angle β

The inclination angle A of the elongated prisms of the prism sheet may be set in accordance with the focus position of the emission light and the size of the surface illuminant device. However, it is preferably set in the range from −20° to+20°, more preferably in the range from −15° to +15° from the viewpoint that the emission light can be focused to a normal viewing position at several tens cm from the prism sheet and also the prism pattern can be easily manufactured, etc.

Figure 6:
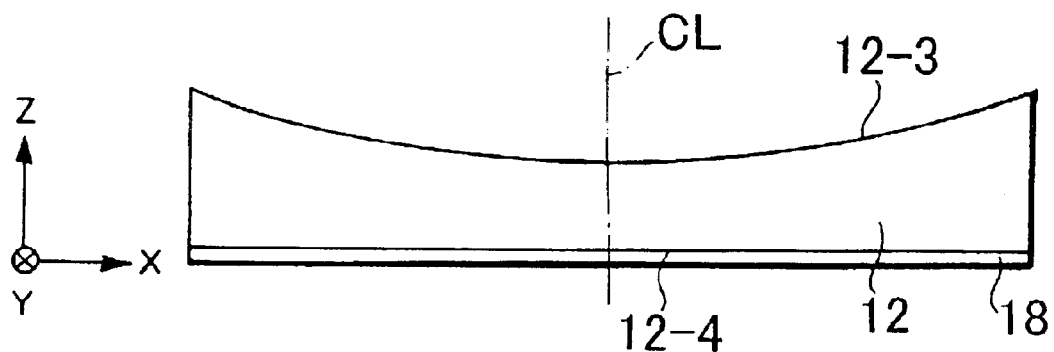
FIG. 6 is a schematic diagram showing an example of a light guide of the surface illuminant device according to the present invention.
Figure 7:
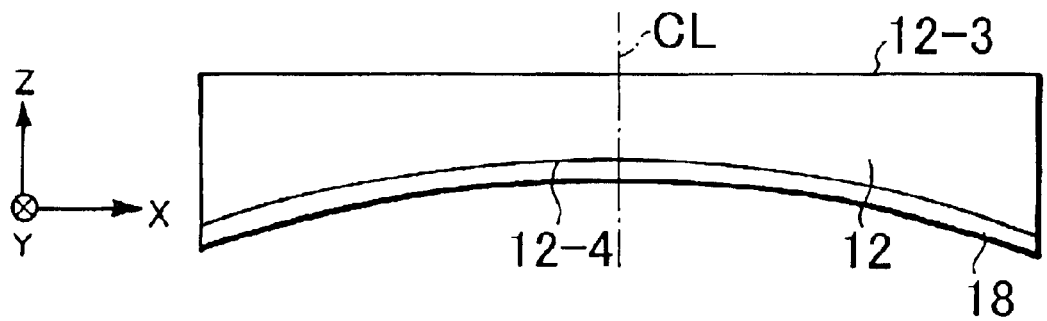
FIG. 7 is a schematic diagram showing an example of the light guide of the surface illuminant device according to the present invention.
Figure 8:
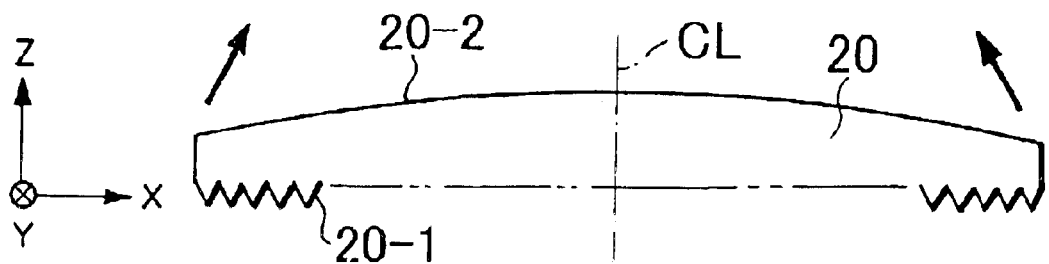
FIG. 8 is a schematic diagram showing an example of the light guide of the surface illuminant device according to the present invention.

Light focusing means shown in FIGS. 6 to 8 is formed by designing the light guide in a special shape. That is, FIGS. 6 to 8 show specific examples when the light guide is equipped with a light focusing function.

In the light guide shown in FIG. 6, the light focusing means is constructed by curving in a concave shape the light emission face 12-3 of the light guide 12 with respect to the X direction perpendicular to the direction of the linear light source. That is, this shape enables the light emitted from the light emission face 12-3 to be diverged within the X-Z plane as a whole (in accordance with the distance from the center line CL of the Z direction within the X-Z plane of the light guide 12, the deflection angle is increased as it is farther away), whereby light which is passed through the prism sheet shown in FIG. 3 or 4 to suffer the prism internal reflection from the incident surface 20-1 is kept under a focused state within the X-Z plane. The curving degree (curvature) is set in accordance with the position of the viewer so that the light is focused to the neighboring of the position of the viewer after passing through the prism sheet.

In the light guide shown in FIG. 7, the light focusing means is constructed by curving the back surface 12-4 of the light guide 12 in the concave shape with respect to the X-direction perpendicular to the direction of the linear light source (that is, the upper surface of the light reflecting member 18 [the joint face with the light guide 12] is curved in a convex shape). With this design, the light which is passed through the back surface 12-4 and emitted from the light emission face 12-3 is diverged within the X-Z plane as a whole, so that the light which is passed through the prism sheet 20 show in FIG. 3 or 4 to suffers the prism internal reflection from the incident surface 20-1 is kept under the focused state within the X-Z plane. The curing degree (curvature) is set in accordance with the position of the viewer so that the light is focused to the neighboring of the position of the viewer after passing through the prism sheet.

In the light guide shown in FIG. 8, the light focusing means is constructed by curving in a convex shape the upper surface (emission surface) 20-2 of the prism sheet 20 with respect to the X-direction perpendicular to the direction of the linear light source. That is, with this design, the light which suffers the prism internal reflection from the incident surface 20-1 and is emitted from the prism sheet through the upper surface 20-2 is kept under the focused state within the X-Z plane as a whole. The curving degree (curvature) is set in accordance with the position of the viewer so that the light is focused to the neighboring of the position of the viewer.

Next, the materials of the light guide and the prism sheet and the manufacturing method thereof will be described.

The light guide and the prism sheet may be formed of synthetic resin having high light transmission. As such synthetic resin may be used methacrylic resin, acrylic resin, polycarbonate resin or vinyl chloride resin. Particularly, methacrylic resin is excellent in light transmission, heat resistance, dynamic characteristics and shaping workability, and it is optimal. As such methacrylic resin is preferably used a resin material which mainly contains methyl methacrylate, the amount of methyl methacrylate being equal to 80 wt % or more.

When such a surface structure that elongated lenses such as the elongated prisms, lenticular lenses or the like of the light guide and the prism sheet are arranged, or a surface structure having a roughened surface is formed, it may be formed by hot-pressing a transparent synthetic resin plate with a mold member having a desired surface structure. When the light guide and the prism sheet are manufactured by extrusion molding, injection molding or the like, they may be shaped at the same time. Furthermore, when the light guide and the prism sheet are manufactured by using thermosetting or light-curable resin or the like, they may be formed at the same time. In this case, the light guide or the prism sheet may be manufactured so that the inside portion thereof and the surface portion thereof which has the roughened surface structure or the elongated lens arrangement structure comprising the lenticular lenses or elongated prisms are different in refractive index. Furthermore, a roughened surface structure comprising activation energy curable resin or a portion having an elongated lens arrangement structure of lenticular lenses, elongated prisms or the like may be formed on a transparent base member such as a transparent film or sheet formed of polyester resin, acrylic resin, polycarbonate resin, vinyl chloride resin, polymethacrylic imide resin or the like. The sheet having the roughened structure or the elongated lens arrangement structure as described above may be integrally joined to another transparent base member by adhesion, fusion or other methods. As the activation energy curable resin may be used multi-functional (meth)acrylic compounds, vinyl compounds, (meth)acrylic esters, allyl compound, metal salts of (meth)acrylic acid or the like.

The light focusing means of FIGS. 5 to 8 implements the focus state within the X-Z plane. However, when the emission surface of the prism sheet has the elongated prisms for deflecting light within the Y-Z plane by using the prism refracting action as shown in FIG. 4, the focus state within the Y-Z plane can be implemented. FIG. 9 schematically shows an example of the light focusing means within the Y-Z plane as described above.

The light focusing means shown in FIG. 9 is formed by curving in the convex shape the lower surface (incident surface) 20-1 of the prism sheet 20 with respect to the direction (Y direction) of the linear light source. That is, with this design, light refracted by the upper surface 20-2 and emitted from the prism sheet is kept under focus state within the Y-Z plane as a whole (in accordance with the distance from CL, the deflection angle is increased as it is farther away). The curving degree (curvature) is set in accordance with the position of the viewer so that the light is focused to the neighboring of the position of the viewer.

In order to implement the focus state within the Y-Z plane when the emission surface of the prism sheet has the elongated prism arrangement for deflecting light within the Y-Z plane by using the prism refracting action as shown in FIG. 4, the light emission face 12-3 or back surface 12-4 of the light guide 12 may be curved in the convex shape within the Y-Z plane.

The light focusing within the Y-Z plane as described above is performed independently of the light focusing within the X-Z plane. Furthermore, plural light focusing means within the X-Z plane as described above may be used in combination with one another, and plural light focusing means within the Y-Z plane as described above may be used in combination with one another. In this case, the radius of curvature of the curving of each part, etc. may be properly set so as to implement the focus state to a desired position.

In the foregoing description, the viewer is located on CL, and CL passes through the center position with respect to the X direction of the prism sheet 20. However, the position of the viewer does not necessarily exist on the line in the Z direction passing through the center position of the prism sheet 20. For example, the light guide 12, the reflecting member 18 and the prism sheet 20 may be constructed by only the right-side portion with respect to CL of FIG. 8 so that the viewer views on CL (in this case, CL is not the center line of the prism sheet 20).

The present invention will be described hereunder by the following example and comparative example. The measurement of the respective characteristics in the example and the comparative example were performed as follows.

Measurement of Average Inclination Angle ($\theta a$)

The measurement was carried out according to ISO4287/1-1987. The surface roughness of the roughened surface was measured at a driving speed of 0.03 mm/second by using a probe type surface-roughness tester (SURFCOM 570A produced by Tokyo Seiki Co., Ltd.) using 010-2528 (1 $\mu$mR, 55° conical, diamond) as a probe. On the basis of a chart achieved through this measurement, the average line thereof was subtracted to correct the inclination, and the average inclination angle was calculated by the equations (1) and (2) described above.

Measurement of Half Maximum Full-width in Luminous Intensity Distribution

A cold cathode tube was used as a light source, and DC 14 V was applied to an inverter (HIU-742A produced by Harison Electric Co., Ltd.) to turn on the cold cathode tube at high frequency. A black sheet having a pin hole of 4 mm$\phi$ was fixed onto the light guide so that the pin hole was located at the center of the light guide, the distance between the light guide and a luminance meter (nt-1° produced by Minolta Co., Ltd.) was adjusted so that a measurement circle was equal to 8 to 9 mm in diameter and the rotational shaft of a goniometer was adjusted to be rotated around the rotational center which was parallel to the extension direction of the cold cathode tube and passes through the pin hole. After 30 minutes or more elapsed as an aging time of the cold cathode tube, the luminous intensity distribution of the emission light was measured by the luminance meter while rotating the rotational shaft at an angular interval of 5° from +80° to −80°. The maximum peak angle and the half maximum full-width (the spreading angle of the distribution at the half of the peak value) of the luminous intensity distribution were determined.

Measurement of In-plane Brightness Ratio

A cold cathode tube was used as a light source, and DC 14 V was applied to an inverter (HIU-742A produced by Harison Electric Co., Ltd.) to turn on the cold cathode tube at high frequency. The position of a luminance meter (nt-1° produced by Minolta Co., Ltd.) disposed so as to be kept spaced from the surface of the surface illuminant device at a distance of 30 cm was varied to measure the brightness at totally three points of the center position of the surface illuminant device and both the positions which were far way from the center position to the right and left sides in the direction perpendicular to the cold cathode tube by 8 cm, and the ratio of the minimum brightness value to the maximum brightness value in these measured brightness values was set as an in-plane luminance ratio.

EXAMPLE 1

Acrylic resin (ACRYPET VH5#000 produced by Mitsubishi Rayon Co., Ltd.) was subjected to injection molding by using a metal mold having one surface as a mirror surface and the other surface as a roughened surface formed by performing a blast treatment using glass beads of 125 to 149 $\mu$m in diameter (FGB-120 produced Fuji Manufacturing Works Co., Ltd.) from a distance of 10 cm under a spray pressure of 4 Kg/cm$^2$ to achieve a wedge-shaped light guide having a mirror surface as one principal surface and a roughened surface of 2.9° in average inclination angle as the other principal surface, which was equal to 195 mm×253 mm in dimension, 3 mm in maximum thickness and 1 mm in minimum thickness. The cold cathode tube was disposed along a side of 253 mm in length (long side) of the light guide so as to face one side end face (the portion of 3 mm in thickness) corresponding to the long side of the light guide. A light diffusion reflecting film (E60 produced by Toray Industries, Inc.) was attached to the other side end face, a reflecting sheet was disposed so as to face the opposite face (back surface) to the roughened surface, and a light source reflector (custom-made silver reflecting film produced by Reiko Co., Ltd.) was disposed The construction thus achieved was installed into the frame body. The maximum peak of the luminous intensity distribution of the emission light before the prism sheet was mounted on the light guide appeared at 70° from the normal line direction and the half maximumfull-width thereof was equal to 27°.

Furthermore, many elongated prisms of 65.4° in apex angle and 50 $\mu$m in pitch were arranged in parallel to one another on polyester film of 188 $\mu$m in thickness having a roughened surface by using acrylic type ultraviolet curable resin so that an elongated prism having an inclination angle of 0° was located at the center position with respect to the elongated prism arrangement direction and the variation rate of the inclination angle was equal to 0.7161°/cm, thereby achieving a prism sheet of 195 mm×253 mm The inclination angle of each elongated prism was set in the range from −7° to +7°.

The prism sheet thus achieved was disposed so that the elongated prism arrangement surface thereof faced the light emission face of the light guide and the prism ridge line was parallel to the light incident face of the light guide. The measured value of the normal line brightness of the surface illuminant device thus achieved was equal to 2425 cd/cm$^2$.

As shown in FIG. 10, the brightness at the center position $T_0$ on the surface illuminant device with respect to the X direction and the brightness at each of the positions $T_1$, $T_2$ which were far away from the center position to the right and left sides in the X-direction by 8 cm were measured by luminance meters located at the positions $S_0$, $S_1$, $S_2$ which were far away from the surface illuminant device at a distance d=30 cm and just above $T_0$, $T_1$, $T_2$, respectively. The in-plane brightness ratio was calculated on the basis of the measured values. The result is shown in a graph of FIG. 11.

COMPARATIVE EXAMPLE 1

A surface illuminant device was fabricated in the same manner as Example 1 except that a prism sheet in which the inclination angles of all the elongated prisms were set to 0° was used. The measured value of the normal line brightness of the surface illuminant device achieved was equal to 2430 cd/cm$^2$.

Figure 11:
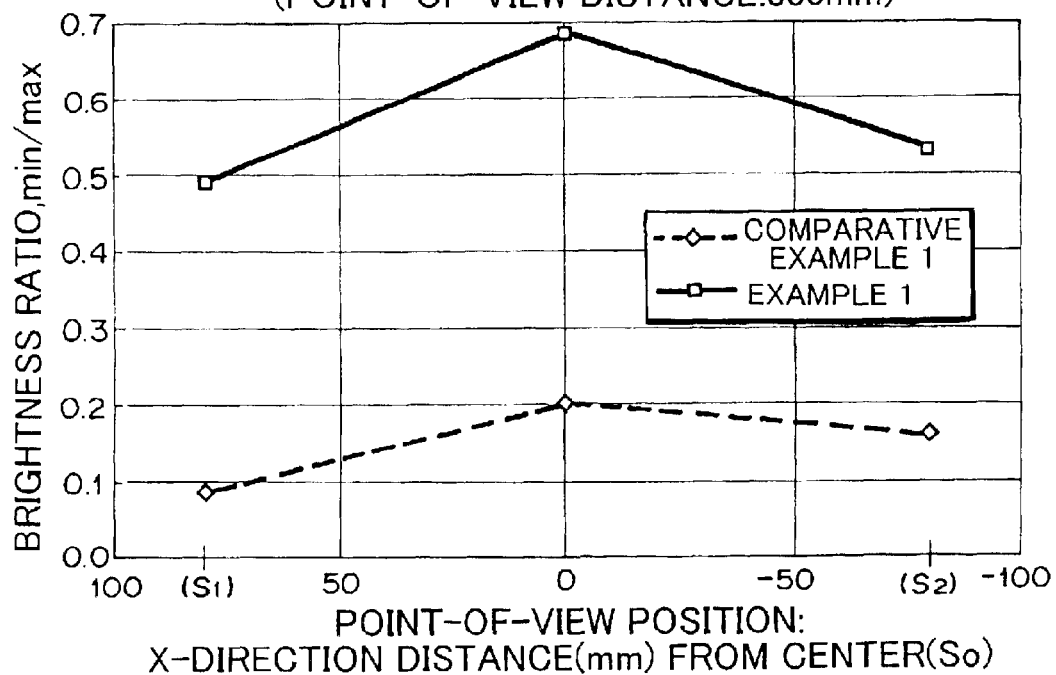
FIG. 11 is a graph showing the relationship between the point-of-view position and the in-plane brightness ratio.

Furthermore, the brightness was measured in the same manner as Example 1, and the in-plane brightness ratio was calculated. The result is shown in the graph of FIG. 11.

According to the present invention, from the results of Example 1 and Comparative example 1 described above, it is apparent that a high in-plane brightness ratio can be achieved in a broad point of view range.

INDUSTRIAL APPLICABILITY

As described above, according to the present invention, there can be provided an edge light type surface illuminant device which can be easily enlarged in area without occurrence of non-uniformity in visibility of a screen or picture plane to be viewed at a short distance by emitting illumination light so that the light is focused to the viewing position.

What is claimed is:

1. A surface illuminant device having a plate-shaped light guide in which one principal surface serves as a light emission face and at least one end face serves as a light incident face, a light source disposed so as to extend along the light incident face of the light guide and a light travel direction converting prism sheet disposed on the light emission face of the light guide, characterized in that an incident surface of said prism sheet is disposed so as to face the light emission face of said light guide, plural elongated prisms are arranged in parallel to one another on the incident surface of said prism sheet so as to extend substantially in parallel to the light incident face of said light guide, said light guide has a light emitting structure with which light introduced into the light guide from said light source through the light incident face is emitted from the light emission face, and there is provided light focusing means for acting on light passed through said light guide and said light travel direction converting prism sheet so that the light is emitted from said prism sheet under a focused state, wherein the light emission face and/or the other principal surface of said light guide is curved in a convex or concave shape in a direction parallel or perpendicular to the light incident face of said light guide.

2. A surface illuminant device having a plate-shaped light guide in which one principal surface serves as a light emission face and at least one end face serves as a light incident face, a light source disposed so as to extend along the light incident face of the light guide and a light travel direction converting prism sheet disposed on the light emission face of the light guide, characterized in that an incident surface of said prism sheet is disposed so as to face the light emission face of said light guide, plural elongated prisms are arranged in parallel to one another on the incident surface of said prism sheet so as to extend substantially in parallel to the light incident face of said light guide, said light guide has a light emitting structure with which light introduced into the light guide from said light source through the light incident face is emitted from the light emission face, and there is provided light focusing means for acting on light passed through said light guide and said light travel direction converting prism sheet so that the light is emitted from said prism sheet under a focused state, wherein said prism sheet is designed so that the apex angles α of said elongated prisms and the variation rate γ of the inclination angles β of the elongated prisms to the normal direction of said prism sheet in a direction perpendicular to the extension direction of each of said elongated prisms satisfy the following conditions:

55 degrees≦α≦75 degrees 0.2 degree/cm≦γ≦1.5 degree/cm whereby light passed through said prism sheet is emitted under the focused state.

3. The surface illuminant device as claimed in claim 1, or 2, wherein said light emitting structure is constructed by a minute unevenness structure formed on the light emission face and/or the other principal surface of said light guide, or by dispersing in a transparent material constituting said light guide a light diffusion material having a refractive index different from that of the transparent material constituting said light guide.

4. The surface illuminant device as claimed in claim 3, wherein the minute unevenness structure comprises a uniformly roughened surface or plural minute elongated lenses extending in parallel to one another.

5. The surface illuminant device as claimed in claim 2, wherein said prism sheet is designed so that all the elongated prisms have substantially the same apex angle α.

6. The surface illuminant device as claimed in claim 2, wherein said prism sheet has elongated prisms arranged at both the sides of an elongated prism whose inclination angle β is nearest to 0 degree in the arrangement direction of said elongated prisms.

7. The surface illuminant device as claimed in claim 2, wherein the inclination angle β of each elongated prism of said prism sheet is continuously or stepwise varied.

8. The surface illuminant device as claimed in claim 2, wherein the inclination angle β of said elongated prisms to the normal direction of said prism sheet is set to −20 degrees to +20 degrees.

9. The surface illuminant device as claimed in claim 1 or 2, wherein said prism sheet is equipped with plural additive elongated prisms that are provided on an emission surface at the opposite side to the incident surface facing the light emission face of said light guide so as to be arranged in parallel to one another in a direction different from the extension direction of said elongated prisms on the incident surface.

10. The surface illuminant device as claimed in claim 1 or 2, wherein the incident surface or emission surface of said prism sheet is curved in a convex or concave shape in a direction perpendicular to the light incident face of said light guide.

11. A prism sheet, characterized in that plural elongated prisms are arranged in parallel to one another on one surface thereof, and the apex angles α of the elongated prisms and the variation rate γ of the inclination angles β of the elongated prisms to the normal direction of said prism sheet in a direction perpendicular to the extending direction of each elongated prism satisfy the following conditions:

55 degrees≦α≦75 degrees 0.2 degree/cm≦γ≦1.5 degree/cm.

12. The prism sheet as claimed in claim 11, wherein all of said elongated prisms have substantially the same apex angle α.

13. The prism sheet as claimed in claim 11, wherein elongated prisms are arranged at both the sides of an elongated prism whose inclination angle β is nearest to 0 degree.

14. The prism sheet as claimed in claim 11, wherein the inclination angle β of said elongated prisms is continuously or stepwise varied.

15. The prism sheet as claimed in claim 11, wherein the inclination angle β of said elongated prisms to the normal direction of said prism sheet is set to −20 degrees to +20 degrees.

16. The prism sheet as claimed in any one of claims 11 to 15, further comprising plural additive elongated prisms arranged on the opposite surface to said one surface in parallel to one another in a direction different from the extension direction of said elongated prisms on said one surface.

17. The prism sheet as claimed in claim 16, wherein the apex angles of said additive elongated prisms are set to 80 to 140 degrees.

18. A surface illuminant device having a plate-shaped light guide in which one principal surface serves as a light emission face and at least one end face serves as a light incident face, a light source disposed so as to extend along the light incident face of the light guide and a light travel direction converting prism sheet disposed on the light emission face of the light guide, characterized in that an incident surface of said prism sheet is disposed so as to face the light emission face of said light guide, plural elongated prisms are arranged in parallel to one another on an emission surface at the opposite side to the incident surface of said prism sheet so as to extend substantially in parallel to the light incident face of said light guide, the incident surface or emission surface of said prism sheet is curved in a convex or concave shape in the direction perpendicular to the light incident face of said light guide, and said light guide has a light emitting structure for emitting from the light emission face light which is introduced into the light guide from said light source through the light incident face.

19. The surface illuminant device as claimed in claim 18, wherein said light emitting structure is constructed by a minute unevenness structure formed on the light emission face and/or the other principal surface of said light guide, or by dispersing in a transparent material constituting said light guide a light diffusion material having a refractive index different from that of the transparent material constituting said light guide.

20. The surface illuminant device as claimed in claim 19, wherein the minute unevenness structure comprises a uniformly roughened surface or plural minute elongated lenses extending in parallel to one another.

21. The surface illuminant device as claimed in any one of claims 18 to 20, wherein the light emission face and/or the other principal surface of said light guide is curved in a convex or concave shape in a direction parallel or perpendicular to the light incident face of said light guide.

* * * * *